US012048055B1

(12) United States Patent
Sekar et al.

(10) Patent No.: US 12,048,055 B1
(45) Date of Patent: Jul. 23, 2024

(54) WIRELESS BEARER ENHANCEMENT BETWEEN A WIRELESS RELAY AND A WIRELESS ACCESS POINT

(71) Applicant: T-MOBILE INNOVATIONS LLC, Overland Park, KS (US)

(72) Inventors: Muthukumaraswamy Sekar, Brambleton, VA (US); Sathyanarayanan Raghunathan, Herndon, VA (US); Maheswaran Vijayakumar, Herndon, VA (US); Suresh Majjara, Herndon, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 207 days.

(21) Appl. No.: 16/394,675

(22) Filed: Apr. 25, 2019

(51) Int. Cl.
*H04W 76/36* (2018.01)
*H04B 7/14* (2006.01)
*H04W 24/02* (2009.01)
*H04W 88/04* (2009.01)

(52) U.S. Cl.
CPC ............. *H04W 76/36* (2018.02); *H04B 7/14* (2013.01); *H04W 24/02* (2013.01); *H04W 88/04* (2013.01)

(58) Field of Classification Search
CPC ..... H04W 76/36; H04W 24/02; H04W 88/04; H04B 7/14
See application file for complete search history.

(56) References Cited

U.S. PATENT DOCUMENTS

| | | | |
|---|---|---|---|
| 7,327,280 B2 | 2/2008 | Bachelder et al. | |
| 8,054,202 B1 | 11/2011 | Sikora et al. | |
| 8,259,659 B2 | 9/2012 | Luft et al. | |
| 8,373,578 B1 | 2/2013 | Sikora et al. | |
| 8,879,519 B2 | 11/2014 | Laroia et al. | |
| 9,781,654 B2 | 10/2017 | Wang et al. | |
| 2011/0235569 A1* | 9/2011 | Huang | H04W 28/02 370/315 |
| 2011/0261747 A1 | 10/2011 | Wang et al. | |
| 2015/0257024 A1* | 9/2015 | Baid | H04W 24/08 370/338 |
| 2016/0100353 A1* | 4/2016 | Gleixner | H04L 12/1407 370/329 |
| 2018/0213577 A1* | 7/2018 | Burbidge | H04W 76/10 |
| 2018/0255610 A1* | 9/2018 | Adachi | H04W 88/04 |
| 2019/0349951 A1* | 11/2019 | Ahmad | H04W 76/14 |
| 2020/0008173 A1* | 1/2020 | Kim | H04W 68/08 |
| 2022/0150754 A1* | 5/2022 | Perras | H04W 84/18 |

* cited by examiner

*Primary Examiner* — Derrick W Ferris
*Assistant Examiner* — M Mostazir Rahman

(57) ABSTRACT

A wireless communication network wirelessly serves User Equipment (UE) over a wireless relay and a wireless access point. The wireless relay exchanges user data with the UE over a UE bearer and exchanges the user data with the wireless access point over a relay bearer. The wireless access point preempts the relay bearer responsive to excessive loading. The wireless relay detects a UE bearer having enhanced UE Quality-of-Service (QoS) and responsively transfers a relay request to the wireless access point. The wireless access point receives the relay request and responsively disables preemption for the wireless relay. The wireless relay exchanges user data with the UE over the other UE bearer having the enhanced UE QoS and exchanges the user data with the wireless access point over the relay bearer having the enhanced relay QoS.

20 Claims, 8 Drawing Sheets

WIRELESS BEARER ENHANCEMENT BETWEEN A WIRELESS RELAY AND A WIRELESS ACCESS POINT

TECHNICAL BACKGROUND

Wireless user devices exchange wireless signals with wireless communication networks for data services like voice-calling, internet-access, and media streaming. The wireless communication networks have wireless access points that exchange the wireless signals with the wireless user devices. The wireless access points typically require wireline backhaul which limits their deployment options. To overcome this wireline backhaul limitation, wireless relays are installed that use wireless backhaul to exchange wireless signals between the wireless user devices and the wireless access points. A wireless relay has an internal wireless access point coupled to an internal wireless user device. The internal access point wirelessly serves the wireless user devices and the internal user device is wirelessly served by a wireless access point.

The wireless user devices, relays, and access points each have antennas, radios, processors, and memory. The processors execute operating systems and network applications to control the transmission and reception of wireless signals. The network applications comprise Physical Layer (PHY), Media Access Control (MAC), Radio Link Control (RLC), Packet Data Convergence Protocol (PDCP), Radio Resource Control (RRC), and Service Data Application Protocol (SDAP). In a wireless access point, the RRC monitors the load on the wireless access point. If the wireless access point becomes overloaded, then the RRC preempts some of the wire user devices and wireless relays that it serves.

Preemption entails the termination of existing wireless links and a time-to-wait before reestablishing the wireless links. Thus, an overloaded wireless access point may preempt a wireless relay which effectively preempts the wireless user devices that are served by the wireless relay. Wireless relay preemption may occur when the wireless relay is serving a wireless user device with a high-quality wireless link like a Guaranteed Bit Rate (GBR) bearer. The wireless access point preempts the wireless relay link which effectively preempts the high-quality wireless link to the wireless user device.

Unfortunately, the wireless access points and wireless relays do not efficiently protect wireless user devices from wireless relay preemption.

TECHNICAL OVERVIEW

A wireless communication network wirelessly serves User Equipment (UE) over a wireless relay and a wireless access point. The wireless relay exchanges user data with the UE over a UE bearer and exchanges the user data with the wireless access point over a relay bearer. The wireless access point preempts the relay bearer responsive to excessive loading. The wireless relay detects a UE bearer having enhanced UE Quality-of-Service (QoS) and responsively transfers a relay request to the wireless access point. The wireless access point receives the relay request and responsively disables preemption for the wireless relay. The wireless relay exchanges user data with the UE over the other UE bearer having the enhanced UE QoS and exchanges the user data with the wireless access point over the relay bearer having the enhanced relay QoS.

DETAILED DESCRIPTION

Figure 1:
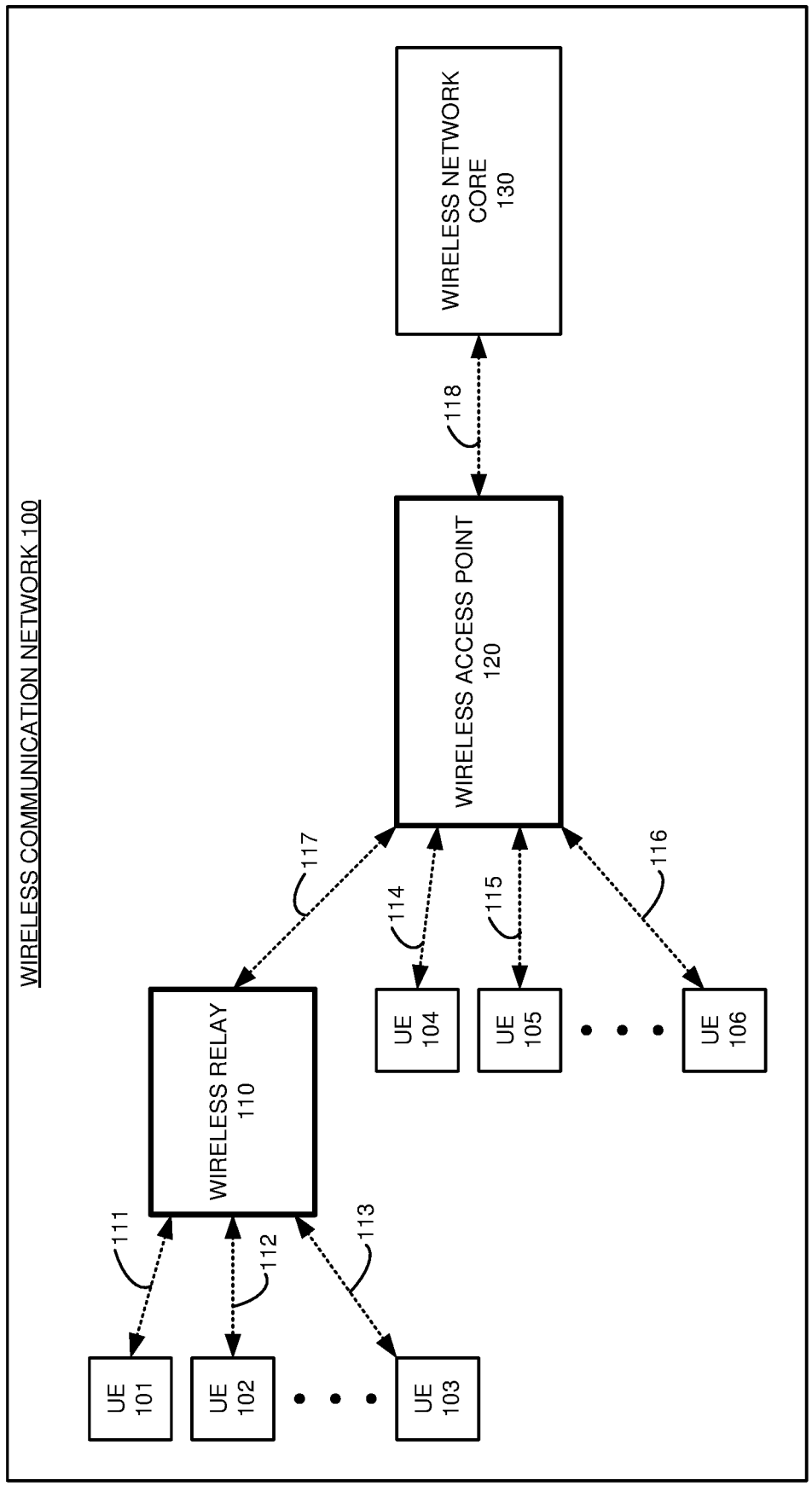
FIG. 1 illustrates a wireless communication network comprising a wireless relay and a wireless access point that serve a User Equipment (UE) over an enhanced relay bearer.

FIG. 1 illustrates wireless communication network 100 comprising wireless relay 110 and wireless access point 120 that serve User Equipment (UEs) 101-103 over enhanced relay bearer 117. Wireless communication network 100 comprises UEs 101-106, wireless relay 110, wireless access point 120, wireless network core 130, and data links 111-118. The number of UEs, wireless relays, and access points that are depicted on FIG. 1 has been restricted for clarity, and wireless communication network 100 includes many more UEs, wireless relays, and access points that are like UEs 101-106, wireless relay 110, and wireless access point 120.

UEs 101-103 and wireless relay 110 communicate over wireless UE bearers 111-113. UEs 104-106 and wireless access point 120 communicate over wireless UE bearers 114-116. Wireless relay 110 and wireless access point 120 communicate over wireless relay bearer 117. Wireless access point 120 and wireless network core 130 communicate over network bearer 118. Exemplary wireless bearer protocols comprise Fifth Generation New Radio (5GNR) links, Long Term Evolution (LTE) links, and Institute of Electrical and Electronic Engineers (IEEE) 802.11 (WIFI) links. Exemplary wireline bearer protocols comprise IEEE 802.3 (Ethernet), Internet Protocol (IP), Time Division Multiplex (TDM), Data Over Cable System Interface Specification (DOCSIS), Wave Division Multiplexing (WDM), and/or the like.

UEs 101-106 might be phones, computers, robots, vehicles, sensors, and/or the like. UEs 101-106 comprise radio circuitry and user circuitry. The radio circuitry comprises antennas, modulators, amplifiers, filters, digital/analog interfaces, processing circuitry, memory circuitry, and bus circuitry. The user circuitry comprises processing circuitry, memory circuitry, bus circuitry, user interfaces, and the like. The memory circuitry stores software that includes operating systems, network applications, and user applications. The network applications comprise Physical Layer (PHY), Media Access Control (MAC), Radio Link Control (RLC), Packet Data Convergence Protocol (PDCP), Radio Resource Control (RRC), and Service Data Application Protocol (SDAP), or some other networking protocol stack. The processing circuitry executes the operating systems, network applications, and user applications to wirelessly exchange user data with wireless relay 110 and/or wireless access point 120. In particular, the processing circuitry executes the operating systems and network applications to use UE bearers 111-116 that may have enhanced Quality-of-Service (QoS). For example, UE 102 may use one of wireless UE bearers 112 that has video-conferencing QoS.

Wireless relay 110 comprises transceiver circuitry and networking circuitry. The transceiver circuitry comprises antennas, modulators, amplifiers, filters, digital/analog interfaces, processing circuitry, and memory. The networking circuitry comprises processing circuitry, and memory circuitry, bus interfaces, and the like. The processing circuitry comprises Digital Signal Processors (DSPs), Central Processing Units (CPUs), Graphical Processing Units (GPUs), Field Programmable Gate Arrays (FPGAs), Application Specific Integrated Circuits (ASICs) and/or the like. The memory circuitry comprises Random Access Memory (RAM), flash memory, disk drives, and/or the like. The memory circuitry stores software like operating systems and network applications. The network applications comprise PHY, MAC, RLC, PDCP, RRC, and SDAP or some other network protocol stack. The processing circuitry executes the operating systems and network applications to wirelessly exchange user data with UEs 101-103 and to wirelessly exchange the user data with wireless access point 120. In particular, the processing circuitry executes the operating systems and network applications to detect when one of UE bearers 111-113 has enhanced UE QoS and responsibly serve UEs 101-103 over relay bearer 117 with enhanced relay QoS. For example, wireless relay 110 may serve UE 102 over one of UE bearers 112 that has the video conferencing QoS, and in response, wireless relay 110 obtains enhanced relay QoS over relay bearer 117 with wireless access point 120.

Wireless access point 130 comprises transceiver circuitry and networking circuitry. The transceiver circuitry comprises antennas, modulators, amplifiers, filters, digital/analog interfaces, processing circuitry, and memory. The networking circuitry comprises processing circuitry, and memory circuitry, bus interfaces, Input/Output (I/O) interfaces, and the like. The processing circuitry comprises DSPs, CPUs, GPUs, FPGAs, ASICs and/or the like. The memory circuitry comprises RAM, flash memory, disk drives, and/or the like. The memory circuitry stores software like operating systems and network applications. The network applications comprise PHY, MAC, RLC, PDCP, RRC, and SDAP or some other network protocol stack. The processing circuitry executes the operating systems and network applications to wirelessly exchange user data with UEs 104-106 and wireless relay 110 and to exchange the user data with wireless network core 130. In particular, the processing circuitry executes the operating systems and network applications to serve wireless relay 110 over relay bearer 117 with enhanced relay QoS when wireless relay 110 serves one of UEs 101-103 with enhanced UE QoS. For example, wireless relay 110 may serve UE 102 over one of wireless UE bearers 112 with the video-conferencing QoS, and in response, wireless access point 120 serves wireless relay 110 over relay bearer 117 with the enhanced relay QoS.

Wireless network core 130 comprises processing circuitry, memory circuitry, bus interfaces, and I/O interfaces. The processing circuitry comprises DSPs, CPUs, GPUs, FPGAs, ASICs, and/or the like. The memory circuitry includes RAM, flash memory, disk drives, and/or the like. The memory stores software like operating systems, virtual layers, and network functions. The network functions comprise Access and Mobility Management Function (AMF), User Plane Function (UPF), Session Management Function (SMF), Policy Control Function (PCF), Authentication Server Function (AUSF), Network Slice Selection Function (NSSF), and the like. The virtual layers comprise operating systems, hypervisors, virtual switches, virtual machines, and the like. The processing circuitry executes the operating systems, virtual layers, and network functions to exchange the user data with wireless access point 120 and external systems.

Wireless relay 110 wirelessly exchanges user data with UEs 101-103 over respective UE bearers 111-113 using standard QoS. For example, the standard QoS could be a non-Guaranteed Bit Rate (non-GBR), best-effort data bearer, and the like. Wireless relay 110 and wireless access point 120 wirelessly exchange the user data over relay bearer 117. Wireless access point 120 monitors access point load like resource block utilization, UE load, CPU occupancy, buffer status, and the like. Wireless access point 120 preempts UEs 104-106 and/or wireless relay 110 if the access point loading exceeds a threshold. Preemption comprises the termination of existing bearers and possibly a time-to-wait before attempting to re-establish the preempted bearers. For example, wireless access point 120 may preempt UE 105 by terminating UE bearers 115 when the resource block utilization load exceeds the utilization threshold.

Wireless relay 110 detects when one of UE bearers 111-113 for UEs 101-103 has enhanced UE QoS. Exemplary UE QoS includes Guaranteed Bit Rate (GBR) bearers, video conferencing bearers, and the like. When wireless relay 110 detects that one of UE bearers 111-113 has the enhanced UE QoS, then wireless relay 110 transfers a relay request to wireless access point 120 to obtain enhanced relay QoS. Wireless access point 120 receives the relay request and responsively disables preemption for wireless relay 110 to enhance the relay QoS. Wireless relay 110 wirelessly exchanges additional user data with the particular one of UEs 101-103 over one of UE bearers 111-113 having the enhanced UE QoS. Wireless relay 110 wirelessly exchanges the additional user data with wireless access point 130 over relay bearer 117 which has enhanced relay QoS. Wireless access point 120 will not preempt wireless relay 110 over relay bearer 117 due to excessive load.

Subsequently, wireless relay 110 detects the termination of all UE bearers 111-113 that have enhanced UE QoS. In response, wireless relay 110 transfers a relay notice to wireless access point 120. Wireless access point 120 receives the relay notice and responsively enables preemption for wireless relay 120. Thus, wireless access point 120 may again preempt wireless relay 110 if the access point loading exceeds the threshold.

Advantageously, wireless relay 110 and wireless access point 120 efficiently protect wireless UEs 101-103 from wireless relay preemption when using high-quality wireless bearers.

Figure 2:
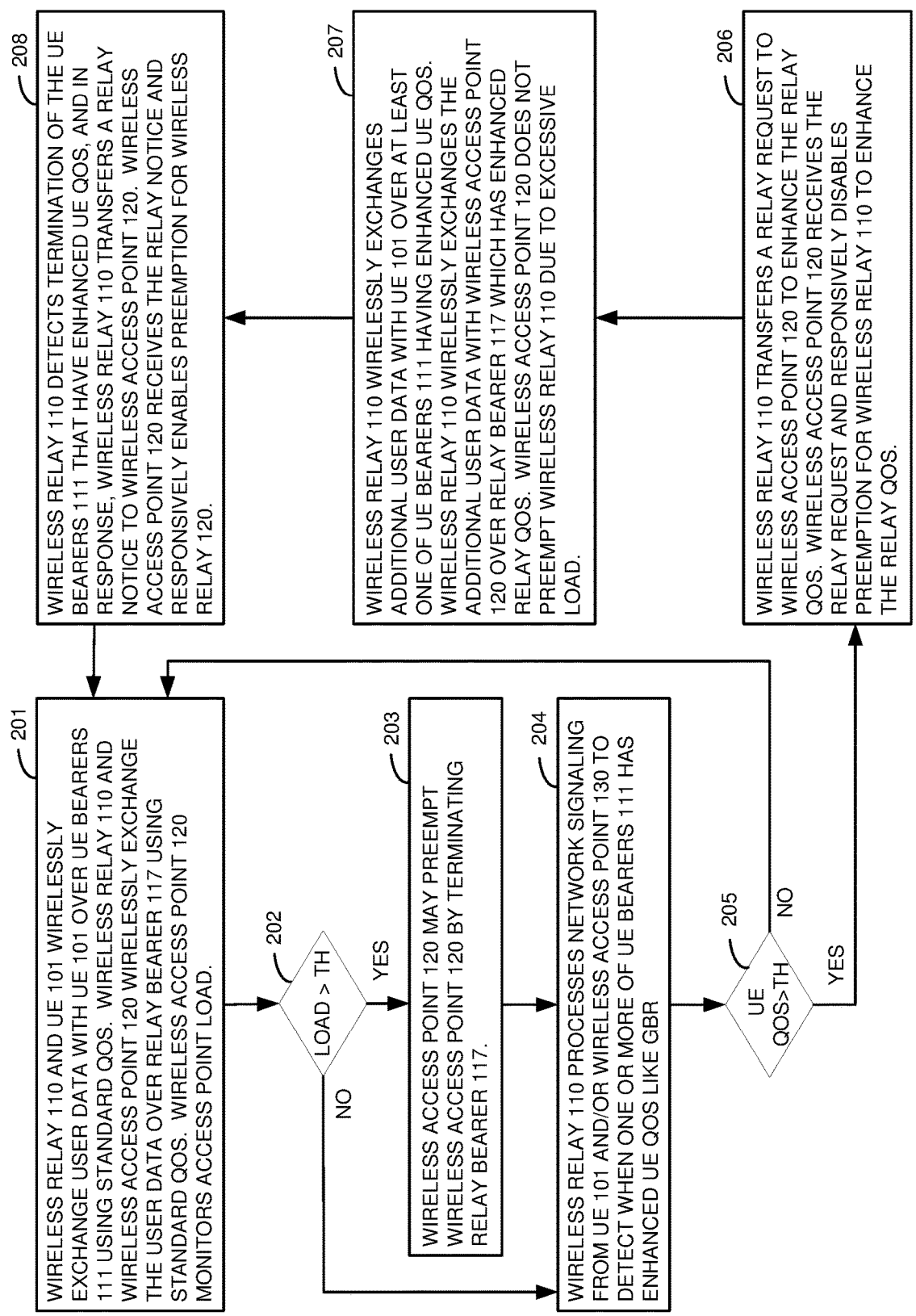
FIG. 2 illustrates the operation of the wireless communication network comprising the wireless relay and the wireless access point that serve the UE over the enhanced relay bearer.

FIG. 2 illustrates the operation of wireless communication network 100 comprising wireless relay 110 and wireless access point 120 that serve UE 101 over enhanced relay bearer 117. Wireless relay 110 wirelessly exchanges user data with UE 101 over at least one of UE bearers 111 using standard QoS like non-GBR or best-effort (201). Wireless relay 110 and wireless access point 120 wirelessly exchange the user data over relay bearer 117 using standard QoS. Wireless access point 120 monitors its access point load.

If the access point load exceeds a threshold (TH) (202), then wireless access point 120 may preempt wireless access point 120 by terminating relay bearer 117 and/or UE bearers 114-116 (203). If the access point load does not exceed the threshold (202), then the operation proceeds to block 204. Wireless relay 110 processes network signaling from UE 101 and/or wireless access point 120 to detect when at least one of UE bearers 111 has enhanced UE QoS like GBR or voice-conferencing (204). If wireless relay 110 detects that one or more of UE bearers 111 has UE QoS above a QoS threshold (205), then wireless relay 110 transfers a relay request to wireless access point 120 to enhance the relay QoS (206). Wireless access point 120 receives the relay request and responsively disables preemption for wireless relay 110 to enhance the relay QoS (206). If wireless relay 110 does not detect at least one of UE bearers 111 having the enhanced UE QoS (205), then the operation returns to block 201.

Wireless relay 110 wirelessly exchanges additional user data with UE 101 over one or more UE bearers 111 having enhanced UE QoS (207). Wireless relay 110 wirelessly exchanges the additional user data with wireless access point 120 over relay bearer 117 which has the enhanced relay QoS—wireless access point 120 does not preempt wireless relay 110 due to excessive load. Wireless relay 110 eventually detects the termination of the UE bearers 111 that have the enhanced UE QoS, and in response, wireless relay 110 transfers a relay notice to wireless access point 120 (208). Wireless access point 120 receives the relay notice and responsively enables preemption for wireless relay 120. The operation returns to block 201.

Figure 3:
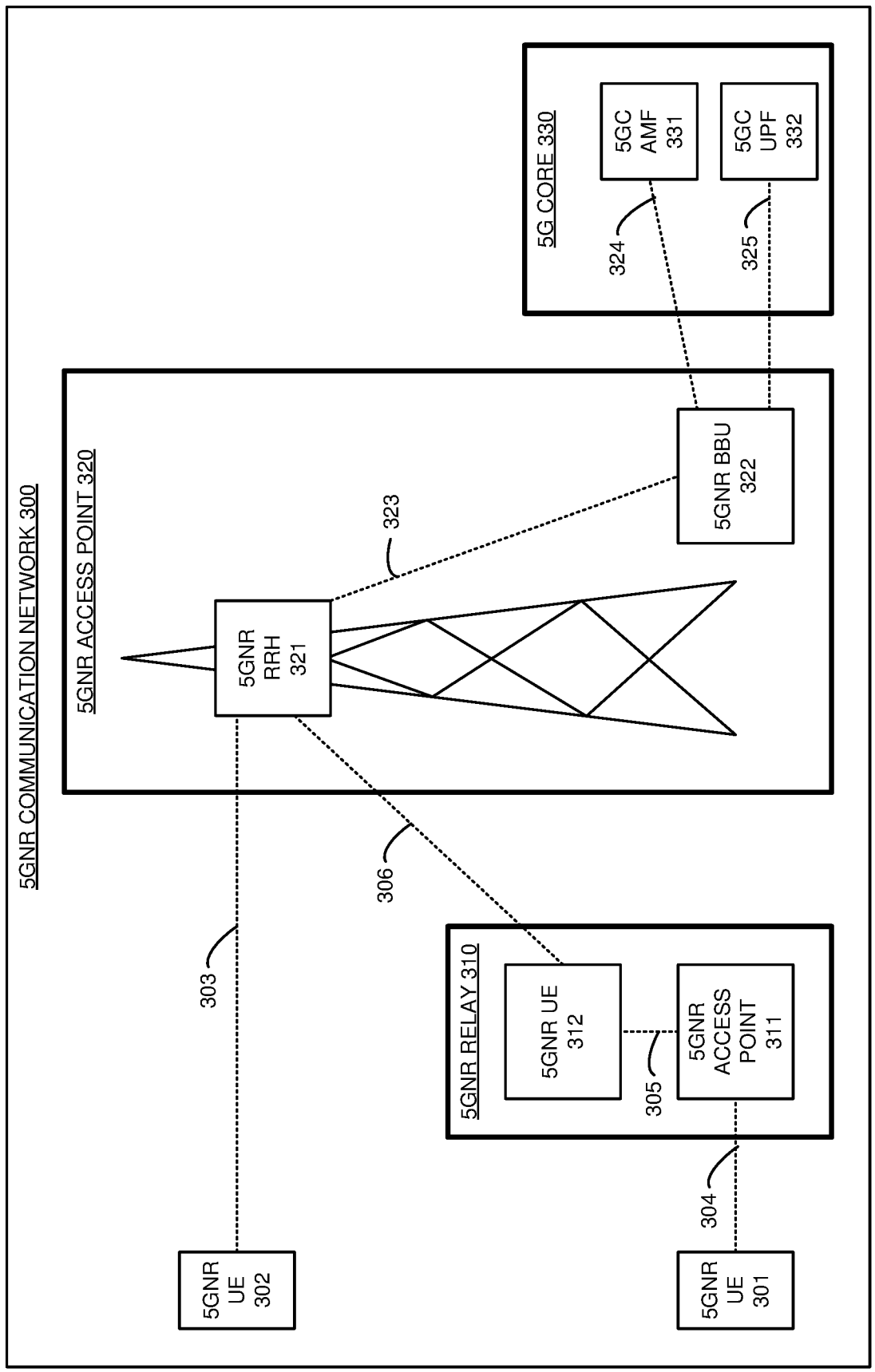
FIG. 3 illustrates a Fifth Generation New Radio (5GNR) communication network comprising a 5GNR wireless relay and a 5GNR wireless access point that serve a 5GNR UE over enhanced non-Guaranteed Bit (non-GBR) bearers.

FIG. 3 illustrates a Fifth Generation New Radio (5GNR) communication network 300 comprising 5GNR relay 310 and 5GNR access point 320 that serve 5GNR UE 301 over enhanced 5GNR non-Guaranteed Bit Rate (non-GBR) bearers. 5GNR communication network 300 is an example of wireless communication network 100, although network 100 may differ. 5GNR communication network 300 comprises 5GNR UEs 301-302, 5GNR relay 310, 5GNR access point 320, and Fifth Generation Core (5GC) 330. 5GNR relay 310 comprises 5GNR access point 311 and 5GNR UE 312. 5GNR access point 320 comprises 5GNR Remote Radio Head (RRH) 321 and 5GNR Baseband Unit (BBU) 322. 5GC 330 comprises 5GC Access and Mobility Management Function (AMF) 331, and 5GC User Plane Function (UPF) 332.

5GNR UE 302 and 5GNR RRH 321 are coupled over 5GNR link 303. 5GNR UE 301 and 5GNR access point 311 are coupled over 5GNR link 304. 5GNR access point 311 and 5GNR UE 312 are coupled over ethernet link 305. 5GNR UE 312 and 5GNR RRH 321 are coupled over 5GNR link 306. 5GNR RRH 321 and 5GNR BBU 322 are coupled over Radio Link Control/Packet Data Convergence Protocol (RLC/PDCP) link 323. 5GNR BBU 322 and 5GC AMF 331 are coupled over 5GC link 324. 5GNR BBU 322 and 5GC UPF 332 are coupled over 5GC link 325. The number of UEs, relays, and access points that are depicted on FIG. 3 has been restricted for clarity, and 5GNR communication network 300 includes many more UEs, relays, and access points.

5GC AMF 331 and 5GNR BBU 322 and exchange N1 and N2 signaling over 5GC link 324. 5GNR BBU 322 and 5GNR RRH 321 exchange X2, N1, and N2 signaling over RLC/PDCP link 323. 5GNR RRH 321 and 5GNR UE 302 exchange RRC and N1 signaling over 5GNR link 303. 5GNR RRH 321 and 5GNR UE 312 exchange RRC, X2, N1, and N2 signaling over 5GNR link 306. 5GNR UE 312 and 5GNR access point 311 exchange X2, N1, and N2 signaling over ethernet link 305. 5GNR access point 311 and 5GNR UE 301 exchange RRC and N1 signaling over 5GNR link 304.

5GNR UE 302 and 5GNR RRH 321 wirelessly exchange user data over 5GNR link 303 using non-GBR bearers. UE 301 and wireless access point 311 wirelessly exchange user data over 5GNR link 304 using non-GBR bearers. Wireless access point 311 and 5GNR UE 312 exchange the user data over ethernet link 305 using non-GBR bearers. 5GNR UE 312 and 5GNR RRH 321 wirelessly exchange the user data over 5GNR link 306 using non-GBR bearers. 5GNR RRH 321 and 5GNR BBU 322 exchange the user data over RLC/PDCP link 306 using non-GBR bearers. 5GNR BBU 322 and 5GC UPF 332 exchange the user data over 5GC link 325 using non-GBR bearers.

In 5GNR access point 320, 5GNR BBU 322 monitors resource block utilization. 5GNR BBU 322 preempts 5GNR UE 302 and/or 5GNR UE 312 when resource block utilization exceeds a utilization threshold. To preempt, 5GNR BBU 322 terminates some or all existing bearers in 5GNR link 303 and/or 5GNR link 306 and requires a time-to-wait before re-establishing the preempted bearers.

Eventually, 5GNR access point 311 processes N2 signaling from 5GC AMF 331 to establish a GBR bearer to detect a GBR bearer on 5GNR link 304. When 5GNR access point 311 detects the GBR bearer on 5GNR link 304, 5GNR access point 311 transfers an X2 message to 5GNR BBU 322 that requests enhanced relay QoS for 5GNR UE 312 over 5GNR link 306. 5GNR BBU 322 receives the X2 message and responsively disables preemption for 5GNR UE 312 over 5GNR link 306 to enhance the relay QoS. 5GNR BBU 322 may still preempt 5GNR UE 302 when the resource block utilization exceeds the utilization threshold.

5GNR UE 301 and 5GNR access point 311 wirelessly exchange user data over 5GNR link 304 using the GBR bearer. 5GNR access point 311 and 5GNR UE 312 exchange the user data over ethernet link 305. 5GNR UE 312 and 5GNR RRH 321 wirelessly exchange the user data over 5GNR link 306 using one or more non-GBR bearers that are exempt from preemption. 5GNR RRH 321 and 5GNR BBU 322 exchange the user data over RLC/PDCP link 306 using one or more non-GBR bearers that are exempt from preemption. 5GNR BBU 322 and 5GC UPF 332 exchange the user data over 5GC link 325 using one or more non-GBR bearers that are exempt from preemption.

Eventually, 5GNR UE 301 and 5GNR access point 311 stop exchanging user data over 5GNR link 304 using the GBR bearer. 5GNR access point 311 processes N2 signaling from 5GC AMF 331 that terminates the GBR bearer to detect the termination. When 5GNR access point 311 detects the termination of the GBR bearer on 5GNR link 304, 5GNR access point 311 transfers an X2 message to 5GNR BBU 322 to terminate the enhanced relay QoS for 5GNR UE 312. 5GNR BBU 322 receives the X2 message and responsively enables preemption for 5GNR UE 312 over 5GNR link 306.

Figure 4:
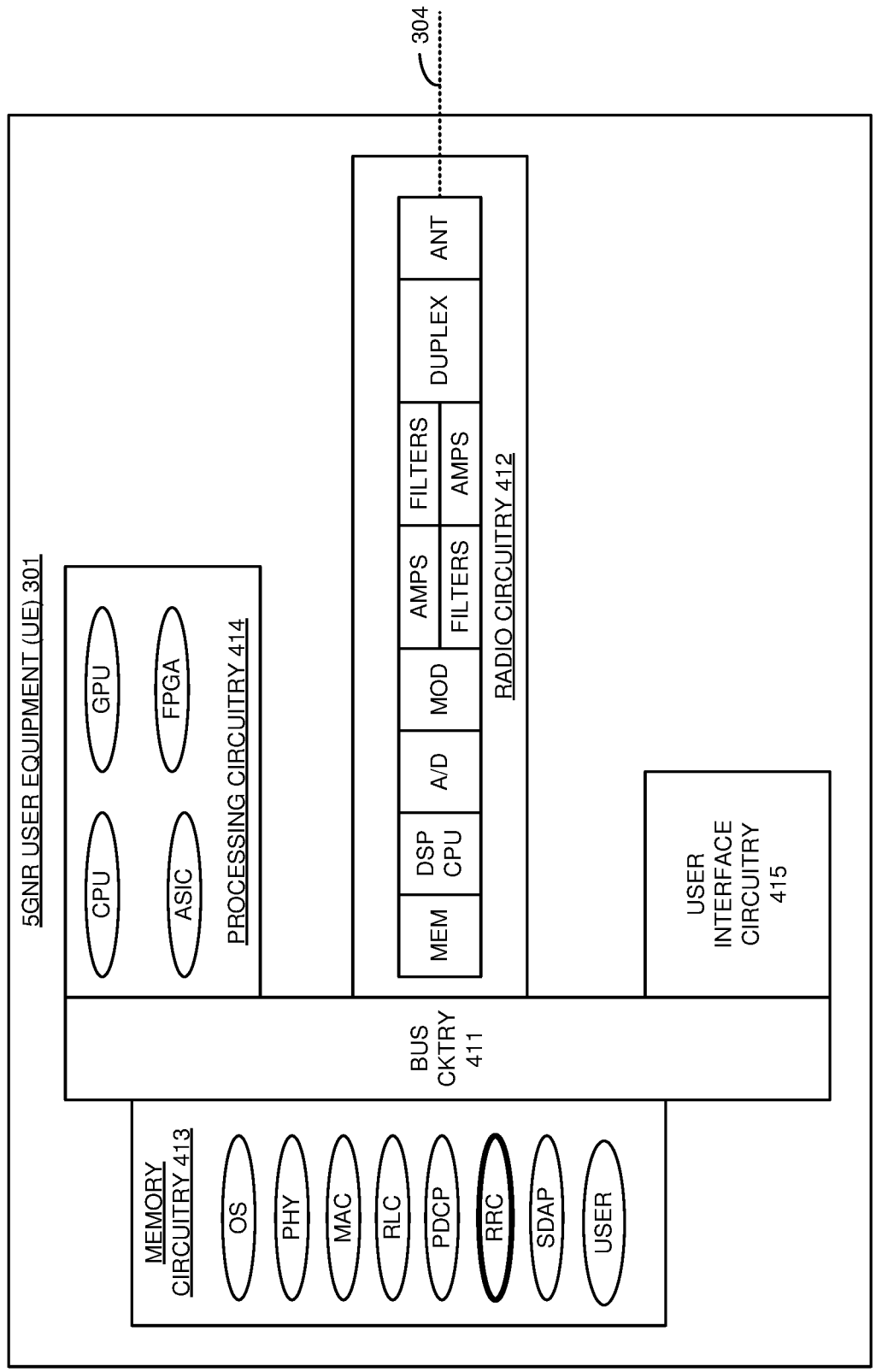
FIG. 4 illustrates the 5GNR UE that is served by the 5GNR relay over the enhanced non-GBR bearers.

FIG. 4 illustrates 5GNR UE 301 that is served by 5GNR relay 310 over 5GNR link 304. 5GNR UE 301 is an example of UEs 101-106 and 302, although UEs 101-106 and 302 may differ. 5GNR UE 301 comprises bus circuitry (cktry) 411, radio circuitry 412, memory circuitry 413, processing circuitry 414, and user interface circuitry 415. User interface circuitry 415 may comprise transceivers, machine controllers, graphic displays, sensors, cameras, and/or some other user components. Bus circuitry 411 couples radio circuitry 412, memory circuitry 413, processing circuitry 414, and user interface circuitry 415.

Memory circuitry 413 comprises volatile and non-volatile memories like RAM, flash, disc, tape, and the like. Memory circuitry 413 stores an operating system (OS), network applications, and user applications (User). The network applications comprise Physical Layer (PHY), Media Access Control (MAC), Radio Link Control (RLC), Packet Data Convergence Protocol (PDCP), Radio Resource Control (RRC), and Service Data Application Protocol (SDAP). Processing circuitry 414 comprises CPUs, GPUs, ASICs, FPGAs, and/or some other computer hardware. Processing circuitry 414 executes the operating system and user applications to generate user data and signaling. Processing circuitry 414 executes the operating system and the network applications to drive radio circuitry 412 to wirelessly exchange the user data and network signaling with 5GNR relay 310 over 5GNR link 304.

Radio circuitry 412 comprises antennas (ANT), duplexers (DUPLEX), filters, amplifiers (AMPS), modulators (MOD), Analog/Digital interfaces (A/D), DSP, CPU, and memory (MEM). The antennas in radio circuitry 412 exchange wireless signals with 5GNR relay 310 that transport the user data and network signaling. In radio circuitry 412, the DSP/CPU executes firmware/software to drive the exchange of corresponding data and signaling between the antennas and memory circuitry 413.

Through the operating system, the user applications exchange user data with the SDAP and exchange user signaling with the RRC. The SDAP maps between user data and Service Data Units (SDUs). The RRC performs attachment and interacts with AMFs over N1 signaling to establish and terminate data sessions. The RRC handles authentication, security, handovers, status reporting, Quality-of-Service (QoS), system broadcasts, and network pages. The RRC and the SDAP exchange the SDUs with the PDCP. The PDCP maps between the SDUs and Protocol Data Units (PDUs) for the RLC. PDCP functions comprise security ciphering, header compression and decompression, sequence numbering and re-sequencing, de-duplication. The PDCP exchange PDUs with the RLC. The RLC maps between the PDUs and MAC logical channels. RLC functions comprise Automatic Repeat Request (ARQ), sequence numbering and resequencing, segmentation and resegmentation. The RLC exchanges the data and signaling from the PDUs with the MAC over MAC logical channels. The MAC maps between the MAC logical channels and MAC transport channels. MAC functions include buffer status, power headroom, channel quality, Hybrid Automatic Repeat Request (HARM), user identification, random access, user scheduling, and QoS. The MAC exchanges the data and signaling with the PHY over the MAC transport channels.

The PHY maps between the MAC transport channels and PHY transport channels. The PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping. The PHY exchanges user data and network signaling with a PHY in 5GNR relay 310 over PHY transport channels.

The PHY stores Uplink (UL) data and signaling in the memory in radio circuitry 412. In radio circuitry 412, the DSP/CPU transfers corresponding UL signals to the analog/digital interface. The analog/digital interface converts the digital UL signals into analog UL signals for the modulators. The modulators up-convert the UL signals to their carrier frequencies. The amplifiers boost the UL signals for the filters which attenuate unwanted out-of-band energy. The filters transfer the UL signals through the duplexers to the antennas. The electrical UL signals drive the antennas to emit corresponding wireless UL signals that transport UL data and signaling to 5GNR relay 310.

In radio circuitry 412, the antennas receive wireless Downlink (DL) signals that transport data and signaling from 5GNR relay 310. The antennas transfer corresponding electrical DL signals through the duplexers to the amplifiers. In radio circuitry 412, the amplifiers boost the received DL signals for filters which attenuate unwanted energy. In modulation, demodulators down-convert the DL signals from their carrier frequencies. The analog/digital interfaces convert the analog DL signals into digital DL signals for the DSP/CPU. The DSP/CPU recovers DL data that includes the user data and network signaling from the DL signals. The DSP/CPU transfers the DL data and signaling to memory circuitry 413. The network applications process the DL data and signaling and forward corresponding user data and signaling to the user applications through the operating system. The user applications process the user data and signaling to drive user interface circuitry 415.

In UE 301, the RRC exchanges RRC signaling with 5GNR relay 310, and the RRC exchanges N1 signaling with 5GC AMF 331 to establish both GBR bearers and non-GBR bearers. In UE 301, the user application may exchange Session Initiation Protocol (SIP) signaling with an Internet Protocol Multimedia Subsystem (IMS) over radio circuitry 412, 5GNR relay 310, 5GNR access point 320, and 5GC 330. The IMS processes the SIP signaling and responsively directs AMF 331 to establish GBR bearers over 5GNR link 304 to serve voice or video conferencing for 5GNR UE 301.

Figure 5:
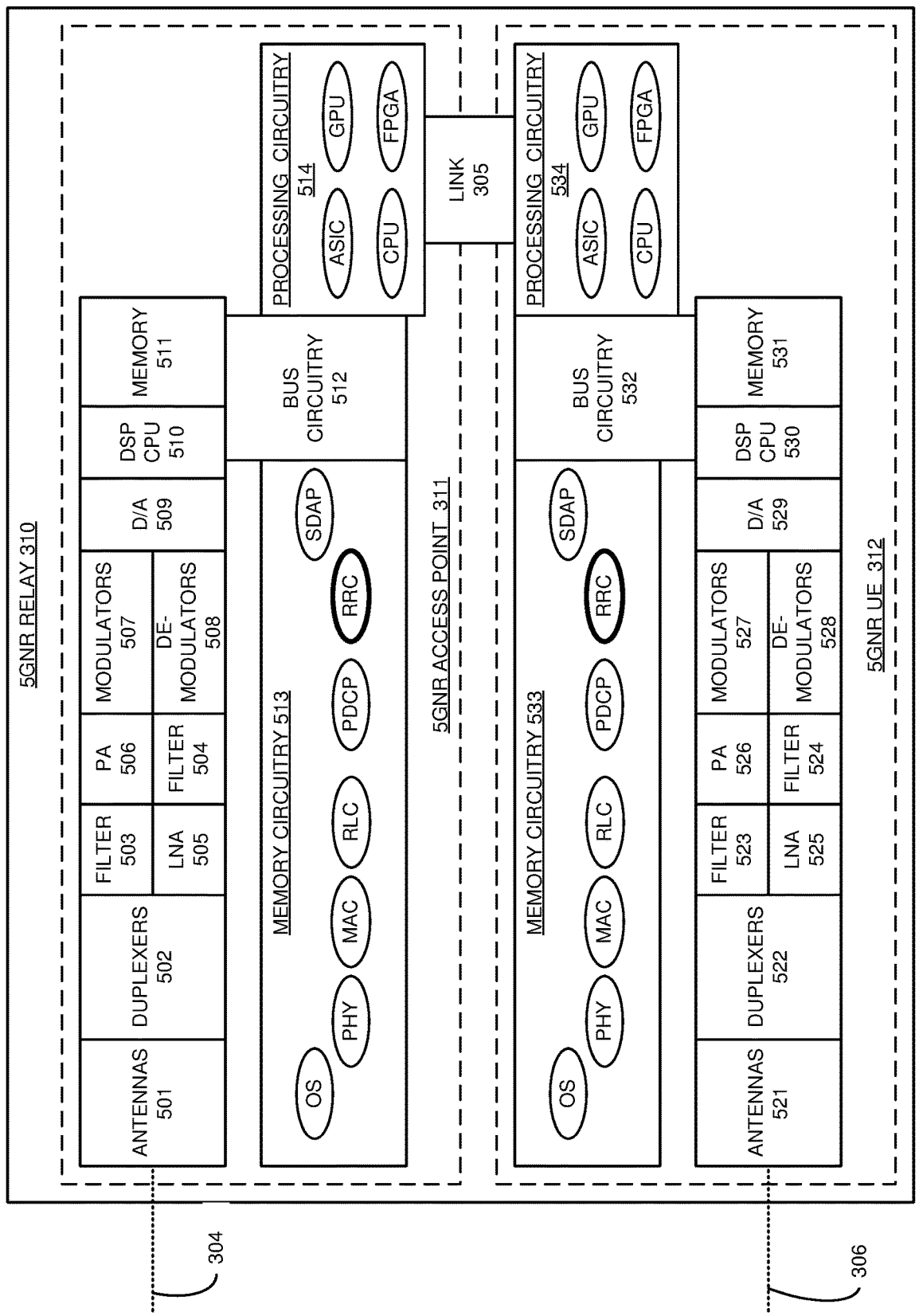
FIG. 5 illustrates the 5GNR relay that serves the 5GNR UE over the enhanced non-GBR bearers.

FIG. 5 illustrates 5GNR relay 310 that serves 5GNR UE 301 over 5GNR link 304. 5GNR relay 310 is an example of wireless relay 110, although relay 110 may differ. 5GNR relay 310 comprises 5GNR access point 311 and 5GNR UE 312 that are coupled by ethernet link 305. 5GNR access point 311 comprises antennas 501, duplexers 502, filters 503-504, Low-Noise Amplifier (LNA) 505, Power Amplifier (PA) 506, modulators 507, de-modulators 508, D/A interfaces 509, DSP/CPU 510, memory 511, bus circuitry 512, memory circuitry 513, and processing circuitry 514. 5GNR UE 312 comprises antennas 521, duplexers 522, filters 523-524, LNA 525, PA 526, modulators 527, de-modulators 528, D/A interfaces 529, DSP/CPU 530, memory 531, bus circuitry 532, memory circuitry 533, and processing circuitry 534. Memory 511, memory 531, memory circuitry 513, and memory circuitry 533 comprise volatile and non-volatile memories like RAM, flash, and the like. Processing circuitry 514 and 534 comprises CPUs, GPUs, ASICs, FPGAs, and/or some other computer circuitry. Memory 511, memory 531, memory circuitry 513, and memory circuitry 533 store operating systems and network applications. The network applications comprise PHY, MAC, RLC, PDCP, RRC, and SDAP. DSP/CPU 510, processing circuitry 514, DSP/CPU 530, and processing circuitry 534 execute the operating system and network applications to exchange data and signaling between 5GNR link 304 and 5GNR link 506.

In 5GNR UE 312, the RRC exchanges N1/N2 signaling with AMF 331 over 5GNR link 306. The RRC in 5GNR UE 312 processes its own N1 signaling and exchanges the other N1 signaling and the N2 signaling with 5GNR access point 311 over ethernet link 305. In 5GNR access point 311, the RRC processes the N2 signaling and exchanges the N1 signaling with 5GNR UE 301 over 5GNR link 304. The RRCs handle data sessions, security, handovers, status reports, QoS, system broadcasts, and network pages.

The SDAPs exchange N3 data between 5GNR UE 301 and 5GNR access point 320. The SDAPs map the N3 data into SDUs and mark the data for the proper QoS. The RRCs and the SDAPs exchange their SDUs with the PDCPs. The PDCPs map between the SDUs and PDUs for the RLCs. PDCP functions comprise security ciphering, header compression and decompression, sequence numbering and re-sequencing, de-duplication. The PDCPs exchange PDUs having the data and signaling with the RLCs. The RLCs map between the PDUs and MAC logical channels. RLC functions comprise ARQ, sequence numbering and resequencing, segmentation and resegmentation. The RLCs exchange the data and signaling with the MACs. The MACs map between the MAC logical channels and MAC transport channels. MAC functions include buffer status, power headroom, channel quality, HARQ, user identification, random access, user scheduling, and QoS. The MACs exchange the data and signaling with the PHYs over the MAC transport channels.

The PHYs map between the MAC transport channels and PHY transport channels. The PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping. The PHY in 5GNR access point 311 exchanges data and signaling with the PHY in 5GNR UE 301 over PHY transport channels in 5GNR link 304. The PHY in 5GNR UE 312 exchanges data and signaling with the PHY in 5GNR access point 320 over PHY transport channels in 5GNR link 306.

In 5GNR access point 311, antennas 501 receive wireless UL signals from 5GNR UE 301 over 5GNR link 304 and transfer corresponding electrical UL signals through duplexers 502 to LNA 505. LNA 505 boosts the UL signals for filter 504 which attenuates unwanted out-of-band energy. De-modulators 508 down-convert the UL signals from their carrier frequencies. D/A interfaces 509 convert the analog UL signals into digital UL signals for DSP/CPU 510. DSP/CPU 510 executes the network applications to recover and store UL data and signaling in memory circuitry 513. Processing circuitry 514 executes the network applications to move UL data and signaling from memory circuitry 513 to memory circuitry 533 in 5GNR UE 312.

In 5GNR UE 312, processing circuitry 534 executes the network applications to transfer UL data and signaling from memory circuitry 533 to memory 531. The network applications drive DSP/CPU 530 to transfer corresponding UL signals to D/A interface 529. D/A interface 529 converts the digital UL signals into analog UL signals for modulators 527. Modulators 527 up-convert the UL signals to their carrier frequencies. PA 526 amplifies the UL signals and transfers the amplified UL signals to filter 523 which attenuates unwanted out-of-band energy. Filter 523 transfers the UL signals through duplexers 522 to antennas 521. The electrical UL signals drive antennas 521 to emit corresponding wireless UL signals to 5GNR access point 320 over 5GNR link 306.

In 5GNR UE 312, antennas 521 receive wireless Downlink (DL) signals from wireless access point 320 over 5GNR link 306 and transfer corresponding electrical DL signals through duplexers 522 to LNA 525. LNA 525 boosts the DL signals for filter 524 which attenuates unwanted out-of-band energy. De-modulators 528 down-convert the DL signals from their carrier frequencies. D/A interfaces 529 convert the analog DL signals into digital DL signals for DSP/CPU 530. DSP/CPU 530 executes the network applications to recover and store DL data and signaling in memory circuitry 533. Processing circuitry 534 executes the network applications to move DL data and signaling from memory circuitry 533 to memory circuitry 513 in 5GNR access point 311.

In 5GNR access point 311, processing circuitry 514 executes the network applications to transfer DL data and signaling from memory circuitry 513 to memory 511. The network applications drive DSP/CPU 510 to transfer corresponding DL signals to D/A interface 509. D/A interface 509 converts the digital DL signals into analog DL signals for modulators 507. Modulators 507 up-convert the DL signals to their carrier frequencies. PA 506 amplifies the DL signals and transfers the amplified DL signals to filter 503 which attenuates unwanted out-of-band energy. Filter 503 transfers the DL signals through duplexers 502 to antennas 501. The electrical DL signals drive antennas 501 to emit corresponding wireless DL signals to 5GNR UE 301 over 5GNR link 304.

In 5GNR access point 311, the RRC exchanges RRC and N1 signaling with 5GNR UE 301 and exchanges N2 signaling with 5GC AMF 331 to establish GBR and non-GBR bearers over 5GNR link 304. 5GNR access point 311 may exchange SIP signaling between 5GNR UE 301 and an IMS that drives AMF 331 to establish GBR bearers over 5GNR link 304. In 5GNR UE 312, the RRC exchanges RRC signaling with the RRC in 5GNR access point 320 and exchanges N1 signaling with 5GC AMF 331 to establish non-GBR bearers over 5GNR link 306. 5GNR UE 312 may get preempted by an overloaded 5GNR access point 320 that may terminate 5GNR link 306.

In 5GNR access point 311, the RRC processes N2 signaling from 5GC AMF 331 to detect and establish GBR bearers on 5GNR link 304. When the RRC in 5GNR access point 311 detects a GBR bearer on 5GNR link 304, the RRC transfers an X2 message to the RRC in 5GNR access point 320 to disable preemption for 5GNR UE 312 over 5GNR link 306. The RRC in 5GNR UE 301 and the RRC in 5GNR access point 311 drive the exchange of user data over one or more GBR bearers in 5GNR link 304. The RRC in 5GNR UE 312 and the RRC in 5GNR access point 320 drive the exchange of the user data over one or more non-GBR bearers in 5GNR link 306 that are exempt from preemption.

5GNR UE 301 and 5GNR access point 311 stop exchanging the user data over 5GNR link 304 using the GBR bearer. The RRC in 5GNR access point 311 processes N2 signaling from 5GC AMF 331 to detect the termination. When the RRC in 5GNR access point 311 detects the termination of the GBR bearer on 5GNR link 304, the RRC transfers an X2 message to the RRC in 5GNR access point 320 to re-enable preemption for 5GNR UE 312 over 5GNR link 306.

Figure 6:
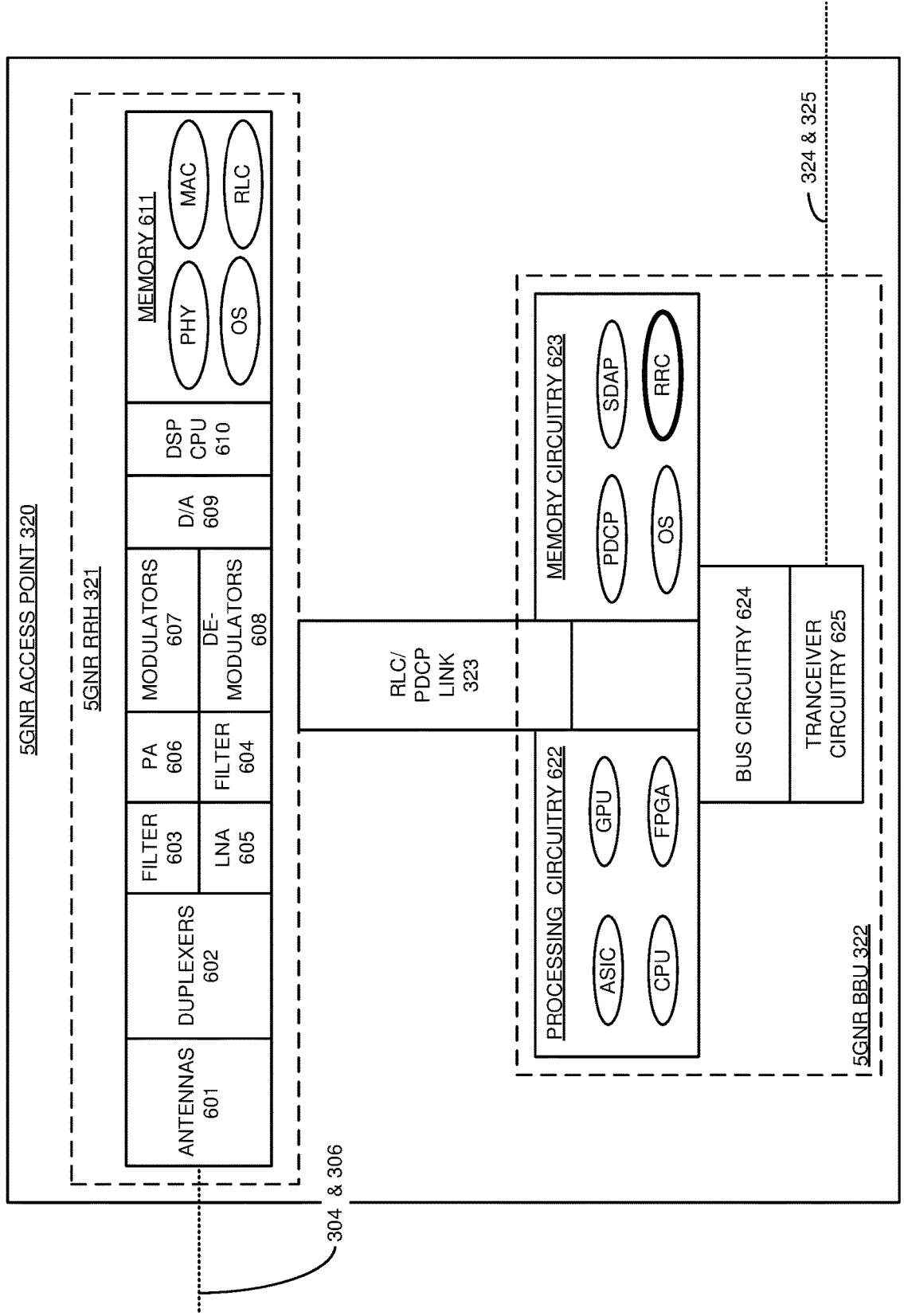
FIG. 6 illustrates the 5GNR access point that serves the 5GNR relay over the enhanced non-GBR bearers.

FIG. 6 illustrates 5GNR access point 320 that serves 5GNR relay 310 over 5GNR link 306. 5GNR access point 320 comprises 5GNR RRH 321 and 5GNR BBU 332 coupled over RLC/PDCP link 323. 5GNR RRH 321 comprises antennas 601, duplexers 602, filters 603-604, LNA 605, PA 606, modulators 607, de-modulators 608, D/A interfaces 609, DSP/CPU 610, and memory 611. 5GNR BBU 322 comprises processing circuitry 622, memory circuitry 623, bus circuitry 624, and transceiver circuitry 625. Memory 611 and memory circuitry 623 comprise volatile and non-volatile memories like RAM, flash, and the like. Processing circuitry 622 comprises CPUs, GPUs, ASICs, FPGAs, and/or some other computer circuitry. In this example, memory 611 stores an operating system and the network applications PHY, MAC, and RLC while memory circuitry 623 stores an operating system and the network applications PDCP, RRC, and SDAP. Other protocol splits could be used in other examples. DSP/CPU 610 and processing circuitry 622 execute the operating systems and network applications to exchange data and signaling between 5GNR links 304 and 306 and 5GC links 324-325.

In 5GNR BBU 322, the RRC exchanges N2/N1 signaling with AMF 331 over 5GC link 324. The RRC exchanges the N1 signaling with 5GNR UE 312 over link 304. The RRC handles data sessions, security, handovers, status reports, QoS, system broadcasts, and network pages. The SDAP exchanges N3 data between 5GNR UE 312 and 5GC UPF 332. The SDAP maps the N3 data into SDUs and mark the data for the proper QoS. The RRC and the SDAP exchange their SDUs with the PDCP. The PDCP map between the SDUs and PDUs for the RLC. PDCP functions comprise security ciphering, header compression and decompression, sequence numbering and re-sequencing, de-duplication. The PDCP exchanges PDUs having the data and signaling with the RLC. The RLC maps between the PDUs and MAC logical channels. RLC functions comprise ARQ, sequence numbering and resequencing, segmentation and resegmentation. The RLC exchanges the data and signaling with the MAC. The MAC maps between the MAC logical channels and MAC transport channels. MAC functions include buffer status, power headroom, channel quality, HARQ, user identification, random access, user scheduling, and QoS. The MAC exchanges the data and signaling with the PHY over the MAC transport channels. The PHY maps between the MAC transport channels and PHY transport channels. The PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, pre-coding, DFTs/IDFTs, and RE mapping/de-mapping. The PHY exchanges the data and signaling with a PHY in 5GNR UE 302 and a PHY in 5GNR UE 312 over the PHY transport channels.

In 5GNR RRH 321, antennas 601 receive wireless UL signals from 5GNR UE 302 and 5GNR UE 312 and transfer corresponding electrical UL signals through duplexers 602 to LNA 605. LNA 605 boosts the UL signals for filter 604 which attenuates unwanted out-of-band energy. De-modulators 608 down-convert the UL signals from their carrier frequencies. D/A interfaces 609 convert the analog UL signals into digital UL signals for DSP/CPU 610. DSP/CPU 610 executes the network applications to recover and store UL data and signaling in memory circuitry 623 in 5GNR BBU 332. Processing circuitry 622 executes the network applications to move UL data and signaling from memory circuitry 623 to transceiver circuitry 625 over bus circuitry 624. Transceiver circuitry 625 transfers the UL data to UPF 332 and transfers the UL signaling to AMF 331.

In 5GNR BBU 322, transceiver circuitry 625 receives Downlink (DL) data from UPF 332 and DL signaling from AMF 331. Transceiver circuitry 625 transfers the DL data and signaling to memory circuitry 623. Processing circuitry 622 executes the network applications to move DL data and signaling from memory circuitry 623 to memory 611 in 5GNR RRH 321. In 5GNR RRH 321, DSP/CPU 610 executes the network applications to transfer DL data and signaling to transfer corresponding DL signals to D/A interface 609. D/A interface 609 converts the digital DL signals into analog DL signals for modulators 607. Modulators 607 up-convert the DL signals to their carrier frequencies. PA 606 amplifies the DL signals and transfers the amplified DL signals to filter 603 which attenuates unwanted out-of-band energy. Filter 603 transfers the DL signals through duplexers 602 to antennas 601. The electrical DL signals drive antennas 601 to emit corresponding wireless DL signals to 5GNR UE 312 and 5GNR UE 302.

5GNR UE 321 and 5GNR RRH 321 wirelessly exchange user data over 5GNR link 306 using non-GBR bearers. 5GNR RRH 321 and 5GNR BBU 322 exchange the user data over RLC/PDCP link 323. 5GNR BBU 322 and UPF 332 exchange the user data over 5GC link 325 using non-GBR bearers. In 5GNR BBU 322, the RRC monitors resource block utilization which comprises the ratio of resource blocks being used to total resource blocks available. The RRC in 5GNR BBU 322 preempts 5GNR UE 312 and/or 5GNR UE 302 when resource block utilization exceeds a utilization threshold. To preempt, the RRC in 5GNR BBU 322 terminates some or all existing bearers in 5GNR link 304 and/or 5GNR link 306 and requires a time-to-wait before re-establishing the preempted bearers.

The RRC in 5GNR BBU 322 receives an X2 message from the RRC in 5GNR access point 311 that requests enhanced QoS for 5GNR UE 312 over 5GNR link 306. In 5GNR BBU 322, the RRC responsively disables preemption for 5GNR UE 312 over 5GNR link 306 to enhance the relay QoS. The RRC may still preempt 5GNR UE 302 when resource block utilization exceeds the utilization threshold. 5GNR UE 312 and 5GNR RRH 321 exchange the user data over 5GNR link 306 using one or more non-GBR bearers that are exempt from preemption. 5GNR RRH 321 and 5GNR BBU 322 exchange the user data over RLC/PDCP link 323 that is exempt from preemption. 5GNR BBU 322 and UPF 332 exchange the user data over 5GC link 325 using one or more non-GBR bearers that are exempt from preemption. Eventually, the RRC in 5GNR BBU 322 receives an X2 message from the RRC in 5GNR access point 511 to terminate the enhanced relay QoS for 5GNR UE 312 over 5GNR link 306. In 5GNR BBU 322, the RRC receives the X2 message and responsively enables preemption for 5GNR UE 312 over 5GNR link 306.

Figure 7:
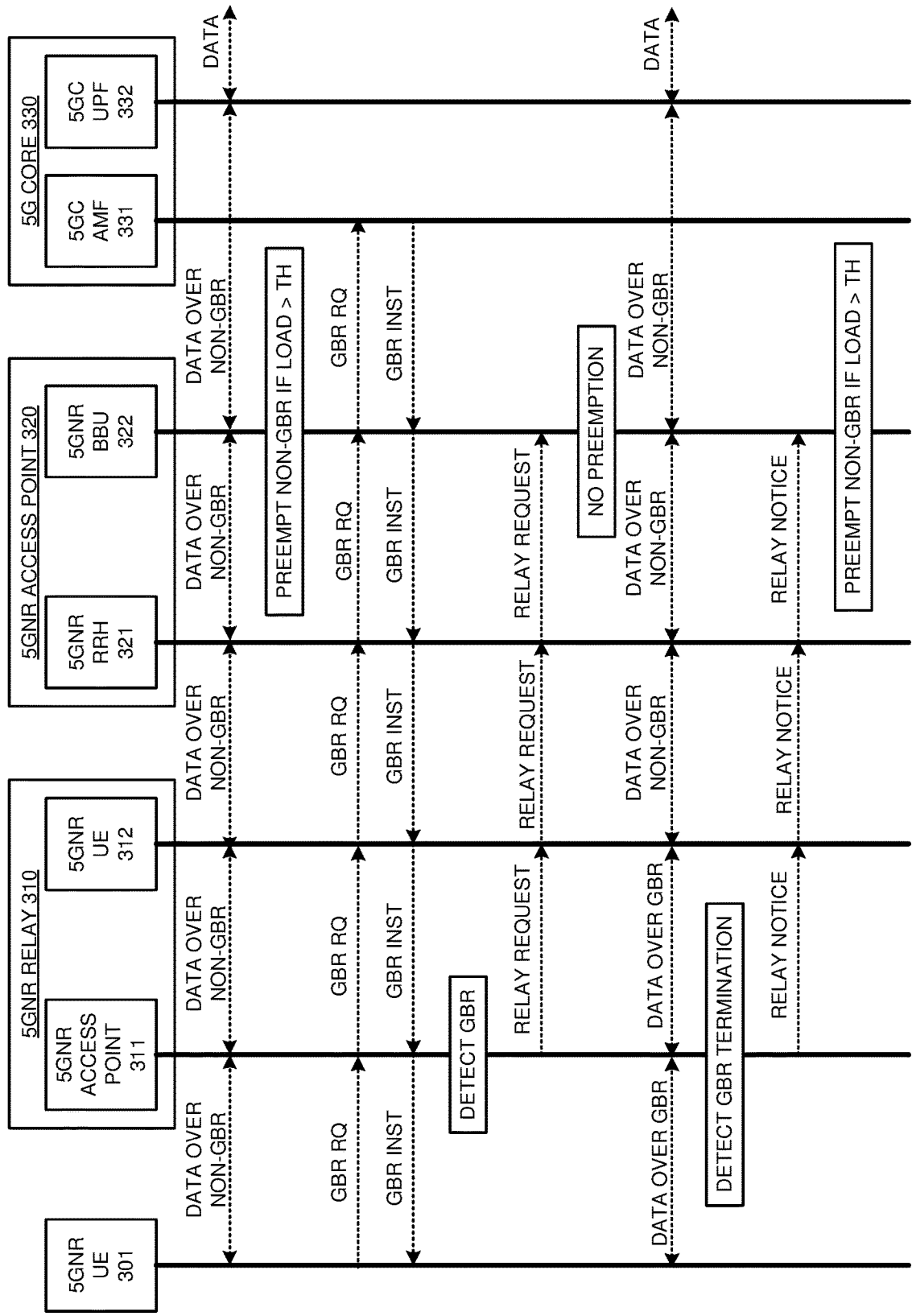
FIG. 7 illustrates the operation of the 5GNR communication network comprising the 5GNR wireless relay and the 5GNR wireless access point that serve the 5GNR UE over the enhanced non-GBR bearers.

FIG. 7 illustrates the operation of 5GNR communication network 300 comprising 5GNR relay 310 and 5GNR access point 320 that serve 5GNR UE 301 over enhanced 5GNR link 306. 5GNR UE 301 and 5GNR access point 311 in 5GNR relay 310 wirelessly exchange user data over non-GBR bearers. 5GNR access point 311 and 5GNR UE 312 exchange the user data over non-GBR bearers. 5GNR UE 312 and 5GNR RRH 321 in 5GNR access point 320 wirelessly exchange the user data over non-GBR bearers. 5GNR RRH 321 and 5GNR BBU 322 exchange the user data over non-GBR bearers. 5GNR BBU 322 and 5GC UPF 332 exchange the user data over non-GBR bearers. 5GC UPF 332 exchanges the user data with external systems. In 5GNR access point 320, 5GNR BBU 322 may preempt 5GNR UE 312 when resource block utilization exceeds the utilization threshold. To preempt, 5GNR BBU 322 terminates bearers in 5GNR link 306 and requires a time-to-wait.

5GNR UE 301 transfers a 5GNR UE request for GBR QoS to 5GNR access point 311. 5GNR access point 311 transfers the 5GNR UE request to 5GNR UE 312 which forwards the UE request to 5GNR RRH 321. 5GNR RRH 321 forwards the 5GNR UE request to 5GNR BBU 322 which transfers a corresponding 5GNR UE request to 5GC AMF 331. In response to the UE request, 5GC AMF 331 interacts with 5G core 330 to generate GBR instructions to establish a GBR bearer over 5GNR link 304. 5GC AMF 331 transfers N2 signaling having the GBR instructions to 5GNR BBU 322 which forwards the N2 signaling to 5GNR RRH 321. 5GNR RRH 321 forwards the N2 signaling having the GBR instructions to 5GNR UE 312 which forwards the N2 signaling to 5GNR access point 311.

5GNR access point 311 processes the GBR instructions in the N2 signaling from 5GC AMF 331 to detect the GBR bearer for 5GNR UE 301. When 5GNR access point 311 detects the GBR bearer for 5GNR UE 301, 5GNR access point 311 transfers a relay request to 5GNR UE 312 which forwards the relay request to 5GNR RRH 321. 5GNR RRH 321 forwards the relay request to 5GNR BBU 322. In response to the relay request, 5GNR BBU 322 disables preemption for 5GNR UE 312 over 5GNR link 306 to enhance relay QoS. 5GNR UE 301 and 5GNR access point 311 wirelessly exchange user data over the GBR bearer. 5GNR access point 311 and 5GNR UE 312 exchange the user data. 5GNR UE 312 and 5GNR RRH 321 wirelessly exchange the user data over one or more non-GBR bearers that are exempt from preemption. 5GNR RRH 321 and 5GNR BBU 322 exchange the user data. 5GNR BBU 322 and 5GC UPF 332 exchange the user data over one or more non-GBR bearers that are exempt from preemption. 5GC UPF 332 exchanges the user data with external systems.

5GNR UE 301 and 5GNR access point 311 eventually stop exchanging user data using the GBR bearer. 5GNR access point 311 processes N2 signaling from 5GC AMF 331 to detect the GBR termination. When 5GNR access point 311 detects the termination of the GBR bearer for 5GNR UE 301, 5GNR access point 311 transfers an X2 message having a relay notice to 5GNR UE 512 which forwards the relay notice to 5GNR RRH 321, 5GNR RRH 321 forwards the relay notice to 5GNR BBU 322. In response, 5GNR BBU 322 enables preemption for 5GNR UE 312. 5GNR BBU 322 may again preempt 5GNR UE 312 when resource block utilization exceeds the utilization threshold.

Figure 8:
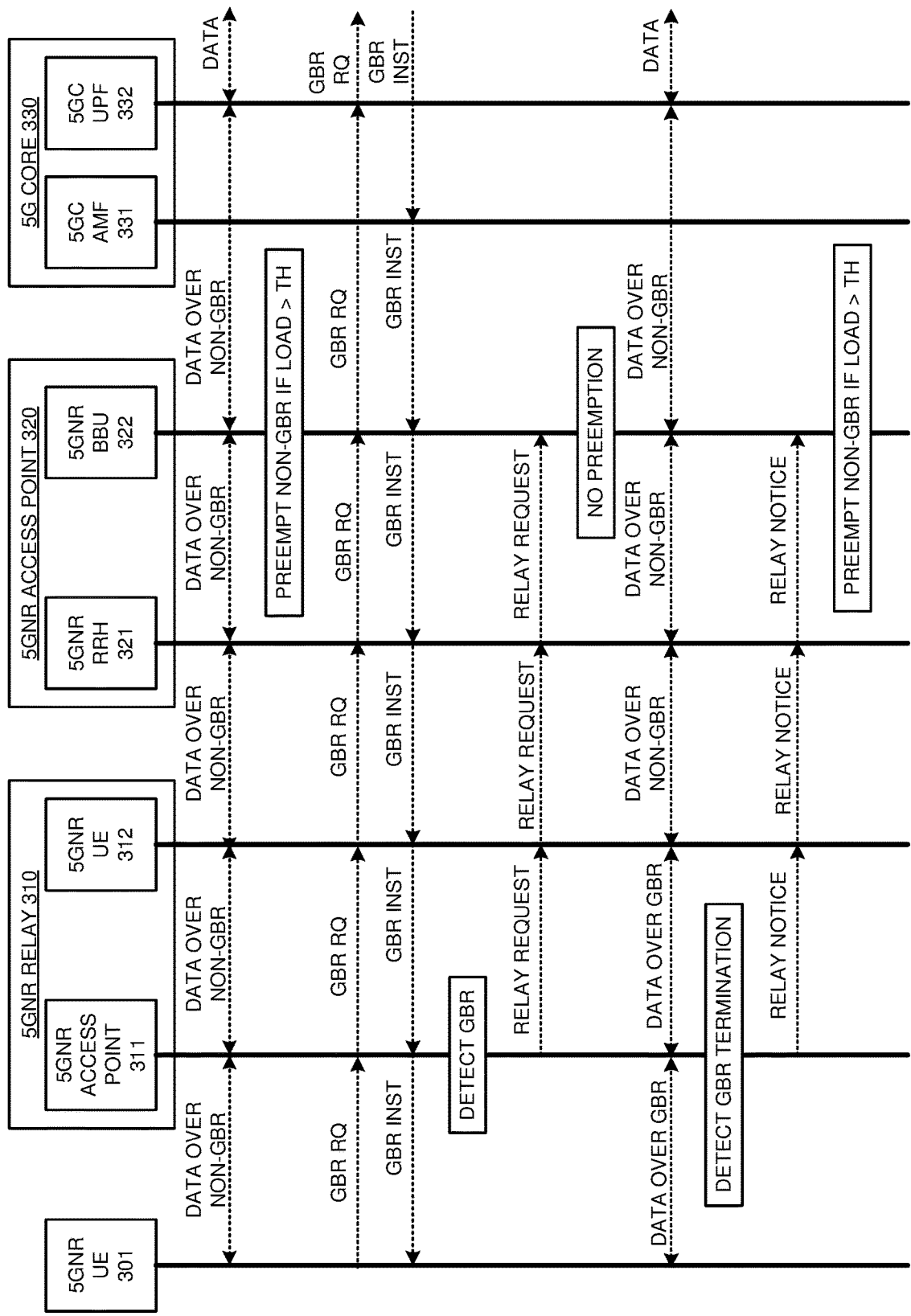
FIG. 8 illustrates the operation of the 5GNR communication network comprising the 5GNR wireless relay and the 5GNR wireless access point that serve the 5GNR UE over the enhanced non-GBR bearers.

FIG. 8 illustrates the operation of 5GNR communication network 300 comprising 5GNR wireless relay 310 and 5GNR wireless access point 320 that serve 5GNR UE 301 over GBR connection 304 and enhanced non-GBR connection 306. 5GNR UE 301 and 5GNR access point 311 in 5GNR relay 310 wirelessly exchange user data over non-GBR bearers. 5GNR access point 311 and 5GNR UE 312 exchange the user data over non-GBR bearers. 5GNR UE 312 and 5GNR RRH 321 in 5GNR access point 320 wirelessly exchange the user data over non-GBR bearers. 5GNR RRH 321 and 5GNR BBU 322 exchange the user data over non-GBR bearers. 5GNR BBU 322 and 5GC UPF 332 exchange the user data over non-GBR bearers. 5GC UPF 332 exchanges the user data with external systems. In 5GNR access point 320, 5GNR BBU 322 may preempt 5GNR UE 312 when resource block utilization exceeds the utilization threshold. To preempt, 5GNR BBU 322 terminates bearers in 5GNR link 306 and requires a time-to-wait.

5GNR UE 301 transfers a Session Initiation Protocol (SIP) message with a GBR request to 5GNR access point 311. 5GNR access point 311 transfers the SIP message to 5GNR UE 312 which forwards the SIP message to 5GNR RRH 321. 5GNR RRH 321 forwards the SIP message to 5GNR BBU 322 which transfers the SIP message to 5GC UPF 332. 5GC UPF 332 transfers the SIP message to an IMS (not shown). The IMS directs AMF 331 to add a GBR bearer for 5GNR UE 301. In response, 5GC AMF 331 transfers N2 signaling having the GBR instructions to 5GNR BBU 322 which forwards the N2 signaling to 5GNR RRH 321. 5GNR RRH 321 forwards the N2 signaling having the GBR instructions to 5GNR UE 312 which forwards the N2 signaling to 5GNR access point 311.

5GNR access point 311 processes the GBR instructions in the N2 signaling from 5GC AMF 331 to detect the GBR bearer for 5GNR UE 301. When 5GNR access point 311 detects the GBR bearer for 5GNR UE 301, 5GNR access point 311 transfers a relay request to 5GNR UE 312 which forwards the relay request to 5GNR RRH 321. 5GNR RRH 321 forwards the relay request to 5GNR BBU 322. In response to the relay request, 5GNR BBU 322 disables preemption for 5GNR UE 312 over 5GNR link 306 to enhance relay QoS.

5GNR UE 301 and 5GNR access point 311 wirelessly exchange user data over the GBR bearer. 5GNR access point 311 and 5GNR UE 312 exchange the user data. 5GNR UE 312 and 5GNR RRH 321 wirelessly exchange the user data over one or more non-GBR bearers that are exempt from preemption. 5GNR RRH 321 and 5GNR BBU 322 exchange the user data. 5GNR BBU 322 and 5GC UPF 332 exchange the user data over one or more non-GBR bearers that are exempt from preemption. 5GC UPF 332 exchanges the user data with external systems.

5GNR UE 301 and 5GNR access point 311 eventually stop exchanging user data using the GBR bearer. 5GNR access point 311 processes N2 signaling from 5GC AMF 331 to detect the GBR termination. When 5GNR access point 311 detects the termination of the GBR bearer for 5GNR UE 301, 5GNR access point 311 transfers an X2 message having a relay notice to 5GNR UE 512 which forwards the relay notice to 5GNR RRH 321, 5GNR RRH 321 forwards the relay notice to 5GNR BBU 322. In response, 5GNR BBU 322 enables preemption for 5GNR UE 312. 5GNR BBU 322 may again preempt 5GNR UE 312 when resource block utilization exceeds the utilization threshold.

The wireless data network circuitry described above comprises computer hardware and software that form special-purpose wireless network circuitry to deliver enhanced QoS between wireless relays and wireless access points. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless network circuitry to deliver enhanced QoS between wireless relays and wireless access points.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to wirelessly serve User Equipment (UE) over a wireless relay and a wireless access point, the method comprising:
   the wireless relay wirelessly exchanging user data with the UE over a UE bearer and wirelessly exchanging the user data with the wireless access point over a relay bearer;
   the wireless access point wirelessly exchanging the user data with the wireless relay over the relay bearer and preempting the relay bearer responsive to excessive loading, wherein preempting the relay bearer comprises terminating the relay bearer and requiring a time-to-wait before re-establishing the relay bearer;
   the wireless relay detecting another UE bearer having enhanced UE Quality-of-Service (QoS) and determining that the enhanced UE QoS of the other UE bearer exceeds a QoS threshold, and transferring a relay request to disable preemption for the relay bearer to the wireless access point responsive to the enhanced UE QoS exceeding the QoS threshold, wherein the other UE bearer having the enhanced UE QoS comprises a voice-conferencing connection or a video-conferencing connection;
   the wireless access point receiving the relay request and responsively disabling preemption for the relay bearer to enhance relay QoS responsive to the enhanced UE QoS wherein the wireless access point does not preempt the relay bearer when preemption is disabled;
   the wireless relay wirelessly exchanging additional user data with the UE over the other UE bearer having the enhanced UE QoS and wirelessly exchanging the additional user data with the wireless access point over the relay bearer having the enhanced relay QoS; and
   the wireless access point wirelessly exchanging the additional user data with the wireless relay over the relay bearer having the enhanced relay QoS.

2. The method of claim 1 further comprising:
   the wireless relay detecting termination of the other UE bearer having the enhanced UE QoS and responsively transferring a relay notice to the wireless access point; and
   the wireless access point receiving the relay notice and responsively enabling preemption for the wireless relay to terminate the enhanced relay QoS responsive to the termination of the enhanced UE QoS.

3. The method of claim 1 wherein the UE bearer comprises a non-Guaranteed Bit Rate (non-GBR) connection and the other UE bearer having the enhanced UE QoS comprises a Guaranteed Bit Rate (GBR) voice connection or a GBR video connection.

4. The method of claim 1 wherein the relay bearer comprises a non-Guaranteed Bit Rate (non-GBR) connection with preemption and the relay bearer having the enhanced relay QoS comprises the non-GBR connection without the preemption.

5. The method of claim 1 wherein the wireless relay detecting the other UE bearer having the enhanced QoS comprises the wireless relay receiving a bearer request from the UE.

6. The method of claim 1 wherein the wireless relay detecting the other UE bearer having the enhanced QoS comprises the wireless relay receiving a bearer instruction from an Access and Mobility Management Function (AMF).

7. The method of claim 1 wherein the excessive access point loading comprises resource block utilization for the wireless access point exceeding a utilization threshold.

8. The method of claim 1 wherein the wireless relay transferring the relay request to the wireless access point comprises the wireless relay transferring X2 signaling to the wireless access point.

9. The method of claim 1 wherein the wireless relay transferring the relay request to the wireless access point comprises a Radio Resource Control (RRC) in the wireless relay transferring the relay request to the wireless access point.

10. The method of claim 1 wherein the UE comprises a phone.

11. The method of claim 1 wherein the UE comprises a computer.

12. The method of claim 1 wherein the UE comprises a vehicle.

13. The method of claim 1 wherein the UE comprises a sensor.

14. The method of claim 1 wherein the UE comprises a Fifth Generation New Radio (5GNR) UE.

15. The method of claim 1 wherein the wireless relay comprises a Fifth Generation New Radio (5GNR) wireless relay.

16. The method of claim 1 wherein the wireless access node comprises a Fifth Generation New Radio (5GNR) wireless access node.

17. The method of claim 1 wherein the UE bearer having the enhanced UE QoS comprises an Institute of Electrical and Electronic Engineers (IEEE) 802.11 (WIFI) bearer.

18. The method of claim 1 wherein the UE bearer having the enhanced UE QoS comprises a Fifth Generation New Radio (5GNR) bearer.

19. The method of claim 1 wherein the UE bearer having the enhanced UE QoS comprises a Long Term Evolution (LTE) bearer.

20. The method of claim 1 wherein the excessive access point loading comprises a UE load on the wireless access point exceeding a UE threshold.

\* \* \* \* \*